(12) United States Patent
Ananth et al.

(10) Patent No.: US 11,456,521 B2
(45) Date of Patent: Sep. 27, 2022

(54) CONTROLLING ANTENNA BEAM GENERATION TO COMPENSATE FOR MOTION OF A HIGH-ALTITUDE PLATFORM

(71) Applicant: SoftBank Corp., Tokyo (JP)

(72) Inventors: Sharath Ananth, Cupertino, CA (US); Paul Heninwolf, San Carlos, CA (US); Simon Scott, San Francisco, CA (US)

(73) Assignee: SoftBank Corp., Tokyo (JP)

( * ) Notice: Subject to any disclaimer, the term of this patent is extended or adjusted under 35 U.S.C. 154(b) by 161 days.

(21) Appl. No.: 16/838,077

(22) Filed: Apr. 2, 2020

(65) Prior Publication Data

US 2021/0313669 A1 Oct. 7, 2021

(51) Int. Cl.
| | |
|---|---|
| H01Q 1/12 | (2006.01) |
| H01Q 3/24 | (2006.01) |
| H04B 7/185 | (2006.01) |
| H01Q 1/28 | (2006.01) |
| H01Q 19/10 | (2006.01) |
| H01Q 19/17 | (2006.01) |

(52) U.S. Cl.
CPC ............ *H01Q 1/1292* (2013.01); *H01Q 1/28* (2013.01); *H01Q 3/24* (2013.01); *H01Q 3/247* (2013.01); *H01Q 19/102* (2013.01); *H01Q 19/175* (2013.01); *H04B 7/18504* (2013.01)

(58) Field of Classification Search
CPC ..... H01Q 1/1292; H01Q 1/28; H04B 7/18504
See application file for complete search history.

(56) References Cited

U.S. PATENT DOCUMENTS

| | | | | |
|---|---|---|---|---|
| 3,546,706 A | * | 12/1970 | Maurer | H01Q 15/161 |
| | | | | 343/840 |
| 3,833,904 A | * | 9/1974 | Gebhardt | G01S 13/528 |
| | | | | 342/194 |
| 3,852,763 A | * | 12/1974 | Kreutel, Jr. | H01Q 19/12 |
| | | | | 343/761 |
| 9,491,635 B2 | | 11/2016 | Hyslop et al. | |
| 9,991,944 B2 | | 6/2018 | Noerpel et al. | |
| 10,181,893 B2 | | 1/2019 | Jalali et al. | |
| 10,249,948 B2 | | 4/2019 | Feria et al. | |

(Continued)

OTHER PUBLICATIONS

International Search Report and Written Opinion for Application No. PCT/US21/22936 dated Jun. 29, 2021.

*Primary Examiner* — Ab Salam Alkassim, Jr.
(74) *Attorney, Agent, or Firm* — Botos Churchill IP Law

(57) ABSTRACT

A method and an antenna system are provided for a high-altitude platform (HAP) configured to move in a pattern in the stratosphere to provide coverage to a region of interest and compensate for HAP movement relative to the region of interest. HAP movement is monitored. When it is determined that the HAP has moved relative to the region of interest and, based on the relative movement, a first one of a plurality of antennas in the HAP is no longer able to cover a selected portion of the region of interest, an antenna array switching circuit in the HAP is used to adjust beams transmitted by the antennas by switching to a second one of the plurality of antennas to cover the selected portion of the region of interest, such that the communication services provided to the region of interest are not interrupted due to the movement of the HAP.

15 Claims, 12 Drawing Sheets

(56) References Cited

U.S. PATENT DOCUMENTS

| | | | |
|---|---|---|---|
| 2003/0052829 A1* | 3/2003 | Desargant | H01Q 1/526 343/705 |
| 2008/0030420 A1* | 2/2008 | Lee | H01Q 3/46 343/853 |
| 2008/0291118 A1* | 11/2008 | Haight | H01Q 15/165 343/915 |
| 2012/0274147 A1* | 11/2012 | Stecher | H02J 7/025 307/104 |
| 2013/0214969 A1 | 8/2013 | Mitchell | |
| 2013/0321201 A1 | 12/2013 | Savoy et al. | |
| 2013/0321206 A1* | 12/2013 | Chang | H01Q 25/00 342/372 |
| 2016/0013858 A1* | 1/2016 | Jalali | H04W 40/06 370/318 |
| 2016/0046387 A1* | 2/2016 | Frolov | B64D 31/00 244/59 |
| 2016/0112116 A1* | 4/2016 | Jalali | H04W 24/10 370/252 |
| 2016/0149301 A1* | 5/2016 | Behroozi | H01Q 3/06 342/359 |
| 2016/0226573 A1* | 8/2016 | Behroozi | H04B 7/18506 |
| 2017/0179582 A1 | 6/2017 | Spall et al. | |
| 2017/0353897 A1* | 12/2017 | Wang | H04W 48/20 |
| 2018/0054251 A1* | 2/2018 | Alex | H04W 52/243 |
| 2018/0123674 A1 | 5/2018 | Freedman et al. | |
| 2018/0294870 A1* | 10/2018 | Van Wynsberghe | B64G 1/40 |
| 2019/0027841 A1* | 1/2019 | Corum | H01Q 3/2629 |
| 2019/0051982 A1* | 2/2019 | Elad | H01Q 19/175 |
| 2020/0287292 A1* | 9/2020 | Zhu | H01Q 3/24 |
| 2020/0329480 A1* | 10/2020 | Katepalli | H04B 7/18506 |
| 2021/0083760 A1* | 3/2021 | Schmidt | H04B 7/18508 |
| 2021/0135744 A1* | 5/2021 | Ananth | H04B 7/18504 |
| 2021/0258067 A1* | 8/2021 | Hoshino | H01Q 21/20 |
| 2021/0258838 A1* | 8/2021 | Ma | H04W 36/0061 |
| 2021/0391917 A1* | 12/2021 | Morozs | H04B 7/18504 |

\* cited by examiner

100

770
772

CONTROLLING ANTENNA BEAM GENERATION TO COMPENSATE FOR MOTION OF A HIGH-ALTITUDE PLATFORM

BACKGROUND

Telecommunications connectivity via the Internet, cellular data networks and other systems is available in many parts of the world. However, there are many locations where such connectivity is unavailable, unreliable or subject to outages from natural disasters. Some systems are able to provide network access to remote locations or to locations with limited networking infrastructure via satellites or other high altitude platforms (HAPs) that are located in the stratosphere. HAPs may communicate with each other and with ground-based networking equipment and mobile devices to provide telecommunications connectivity, for instance according to the Long-Term Evolution (LTE) standard.

A HAP may include a communication platform with multiple sectors that provide Internet service to different areas on the ground via respective beams. The narrower the beam that is generated, the better the gain of the antenna and the better the link budget. A desired coverage area may include a number of beams, where each beam corresponds to a different sector from a client device perspective.

BRIEF SUMMARY

As a given HAP provides service to a selected location, it may need to maneuver or take other corrective action to remain "on station". Depending on the type of HAP and its corrective action, the beams it emits may move (e.g., rotate) relative to the ground at a rapid rate. This movement can require repeated handovers or other adjustments for the sectors of the communication platform, which can increase processing requirements, create communication delays and cause battery drain for the HAP and client devices. Some handover problems may be addressed via digital beam forming (DBF). However, DBF can be expensive in terms of power and equipment weight because a large number of antenna elements may be required, in which more elements may be necessary at higher frequencies. Further, if parabolic reflector antennas are used, the scan angle would be limited to a few degrees, thus making it difficult or impossible to track the HAP's movement.

During station keeping, the sectors of the communication platform can rotate at a rapid rate relative to the ground, for instance as the HAP moves in a circular or other pattern in the sky. In one example, a user equipment (UE) or other client device may encounter a new beam every 10-20 seconds. This can cause the UE to perform repeated re-selections while in idle mode, or multiple handovers while in a connected mode. This can significantly degrade battery life of the UE, and adversely impact throughput of the telecommunication system.

In view of this, according to aspects of the technology, specialized antenna structures are employed on HAPs that station keep over a region of interest. These structures avoid the constraints of digital beam forming, and provide a robust architecture for mobile HAPs, such as those that operate in the stratosphere.

In one aspect, an antenna system for a high-altitude platform (HAP) is provided to move in a pattern in the stratosphere to provide communication services to a region of interest, the antenna system configured to compensate for movement of the HAP in the stratosphere relative to the region of interest. The antenna system comprises a controller, an antenna array switching circuit configured to receive communication signals from the controller associated with a plurality of beams, and a plurality of antennas operatively coupled to the antenna array switching circuit, each of the antennas being configured to transmit beams that provide communication services to a selected portion of the region of interest. The controller is configured to determine that the HAP has moved in the stratosphere relative to the region of interest, determine, based on the relative movement, that a first one of the plurality of antennas is no longer able to cover the selected portion of the region of interest, and cause the antenna array switching circuit to adjust the beams transmitted by the antennas by switching to a second one of the plurality of antennas to cover the selected portion of the region of interest, such that the communication services provided to the region of interest are not interrupted due to the movement of the HAP.

The plurality of antennas may form either a phased antenna array or a non-phased array. The plurality of antennas may be cylindrical antennas. Each of the cylindrical antennas includes a two-element fed reflector having two feeds placed along an axis of a semi-cylindrical reflector, each of the feeds having a phase that is variable so as to scan in azimuth or elevation. A center beam and any exterior beams surrounding the center beam may be configured to cover the region of interest having a diameter of at least 40 km. The beams include at least a set of exterior beams disposed around a center beam. The set of exterior beams may comprise at least 6 beams. The antenna array switching circuit may comprise a field-programmable gate array (FPGA) configured to route feed signals to the plurality of antennas. The plurality of antennas may be torus antennas. Feeds to the antennas may be switched to compensate for the movement of the HAP. Each of the feeds to the antennas may be selected based on at least one of elevation or azimuth. A HAP may be configured to comprise the antenna system and operate in the a propulsion system operatively coupled to the antenna system. The propulsion system may be configured to adjust a position of the HAP in the stratosphere relative to the region of interest.

In another aspect, a method of controlling a HAP to move in a pattern in the stratosphere to provide coverage to a region of interest and compensate for movement of the HAP relative to the region of interest The method comprises monitoring, by a controller, movement of the HAP in the stratosphere, determining, by the controller, that the HAP has moved in the stratosphere relative to the region of interest, determining, by the controller based on the relative movement, that a first one of a plurality of antennas in the HAP is no longer able to cover a selected portion of the region of interest, and cause, by the controller, an antenna array switching circuit in the HAP to adjust beams transmitted by the antennas by switching to a second one of the plurality of antennas to cover the selected portion of the region of interest, such that the communication services provided to the region of interest are not interrupted due to the movement of the HAP.

DETAILED DESCRIPTION

Overview

Figure 1:
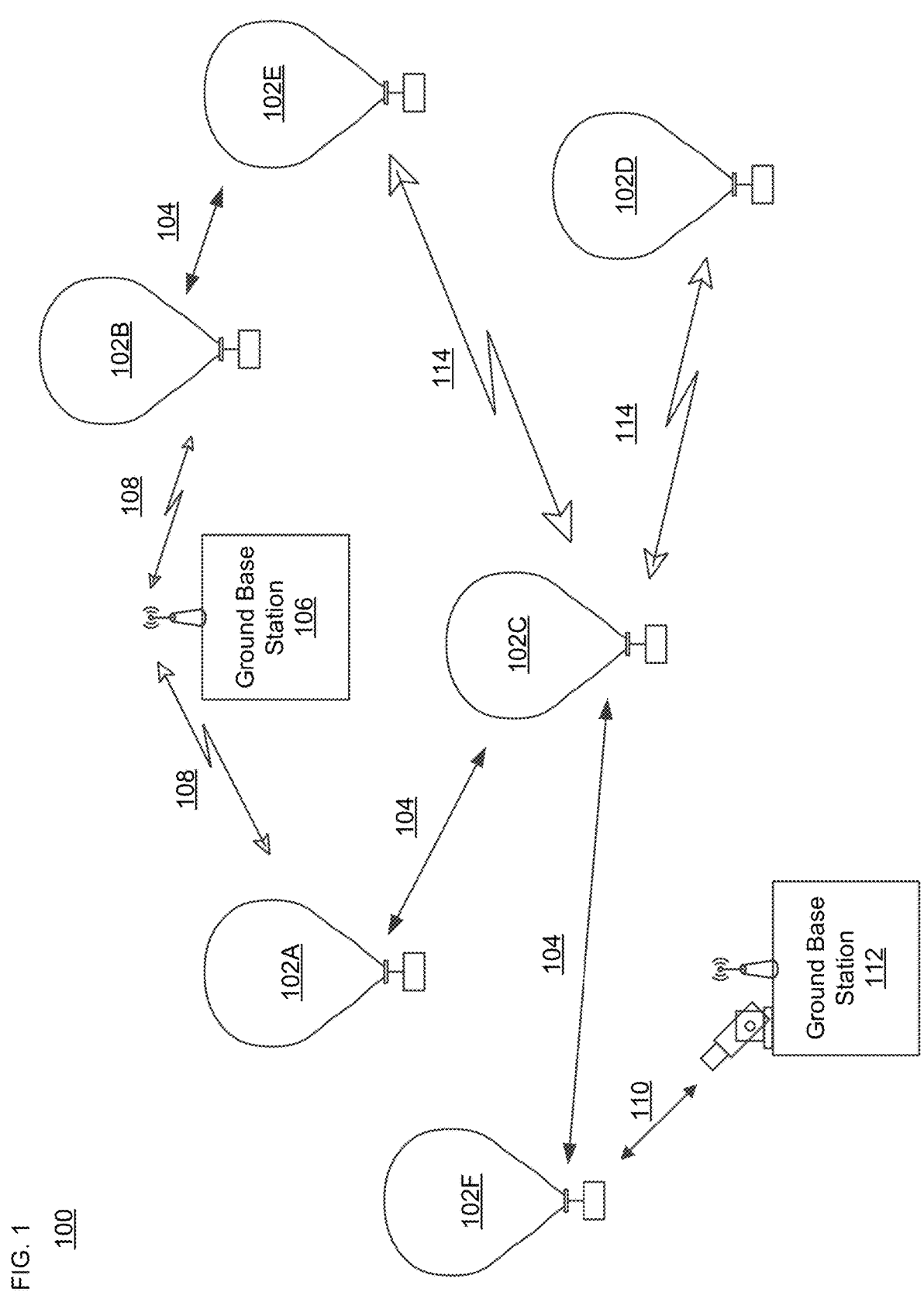
FIG. 1 is a functional diagram of an example system in accordance with aspects of the technology.

FIG. 1 depicts an example system 100 in which a fleet of balloons or other high altitude platforms described above may be used. This example should not be considered as limiting the scope of the disclosure or usefulness of the features described herein. System 100 may be considered a balloon network. In this example, balloon network 100 includes a plurality of devices, such as balloons 102A-F as well as ground base stations 106 and 112. Balloon network 100 may also include a plurality of additional devices, such as various devices supporting a telecommunication service (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities. In one example using LTE communication, the base stations may be Evolved Node B (eNodeB) base stations. In another example, they may be base transceiver station (BTS) base stations. These examples are not limiting.

In some examples, the links may not provide a desired link capacity for HAP-to-ground communications. For instance, increased capacity may be desirable to provide backhaul links from a ground-based gateway. Accordingly, an example network may also include balloons, which could provide a high-capacity air-ground link between the various balloons of the network and the ground base stations. For example, in balloon network 100, balloon 102F may be configured to directly communicate with station 112.

Like other balloons in network 100, balloon 102F may be operable for communication (e.g., RF or optical) with one or more other balloons via link(s) 104. Balloon 102F may also be configured for free-space optical communication with ground-based station 112 via an optical link 110. Optical link 110 may therefore serve as a high-capacity link (as compared to an RF link 108) between the balloon network 100 and the ground-based station 112. Balloon 102F may additionally be operable for RF communication with ground-based stations 106. In other cases, balloon 102F may only use an optical link for balloon-to-ground communications.

The balloon 102F may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of HAPs (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links or RF links, the balloons may collectively function as a free-space optical or RF mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. Balloon network 100 may also implement station-keeping functions using winds and altitude control or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. For instance, the balloons may move in response to riding a wind current, or may move in a circular or other pattern as they station keep over a region of interest.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Other than balloons, drones may fly routes in an autonomous manner, carry cameras for aerial photography, and transport goods from one place to another. The terms "unmanned aerial vehicle (UAV)" and "flying robot" are often used as synonyms for a drone. The spectrum of applications is broad, including aerial monitoring of industrial plants and agriculture fields as well as support for first time responders in case of disasters. For some applications, it is beneficial if a team of drones rather than a single drone is employed. Multiple drones can cover a given area faster or take photos from different perspectives at the same time.

The balloons of FIG. 1 may be high-altitude balloons that are deployed in the stratosphere. As an example, in a high altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. Lateral propulsion may also be employed to affect the balloon's path of travel.

Figure 2:
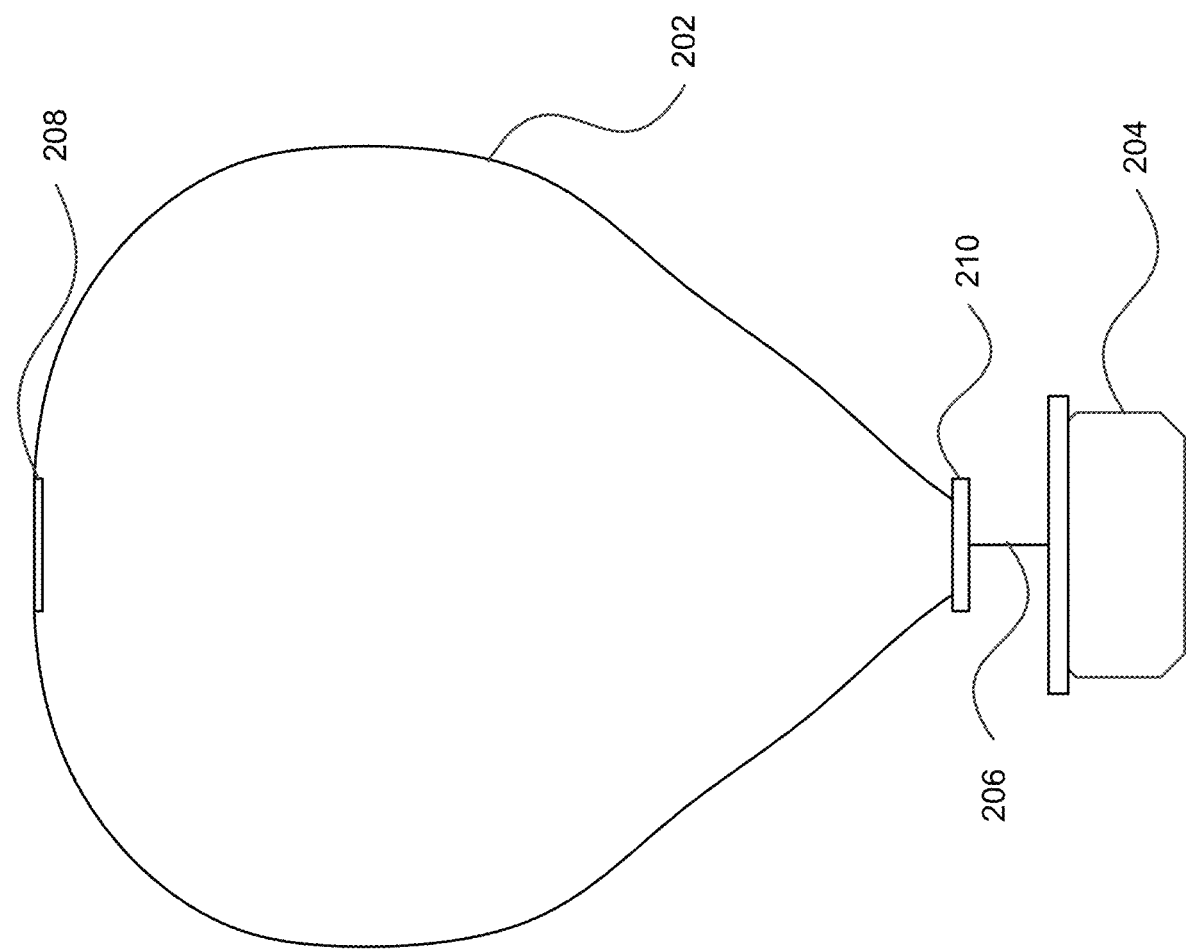
FIG. 2 illustrates a balloon configuration in accordance with aspects of the technology.

In an example configuration, the high altitude balloon platforms include an envelope and a payload, along with various other components. FIG. 2 is one example of a high-altitude balloon 200, which may represent any of the balloons of FIG. 1. shown, the example balloon 200 includes an envelope 202, a payload 204 and a coupling member (e.g., a down connect) 206 therebetween. At least one gore panel forms the envelope, which is configured to maintain pressurized lifting gas therein. For instance, the balloon may be a superpressure balloon. A top plate 208 may be disposed along an upper section of the envelope, while a base plate 210 may be disposed along a lower section of the envelope opposite the top place. In this example, the coupling member 206 connects the payload 204 with the base plate 210.

The envelope 202 may take various shapes and forms. For instance, the envelope 202 may be made of materials such as polyethylene, mylar, FEP, rubber, latex or other thin film materials or composite laminates of those materials with fiber reinforcements embedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
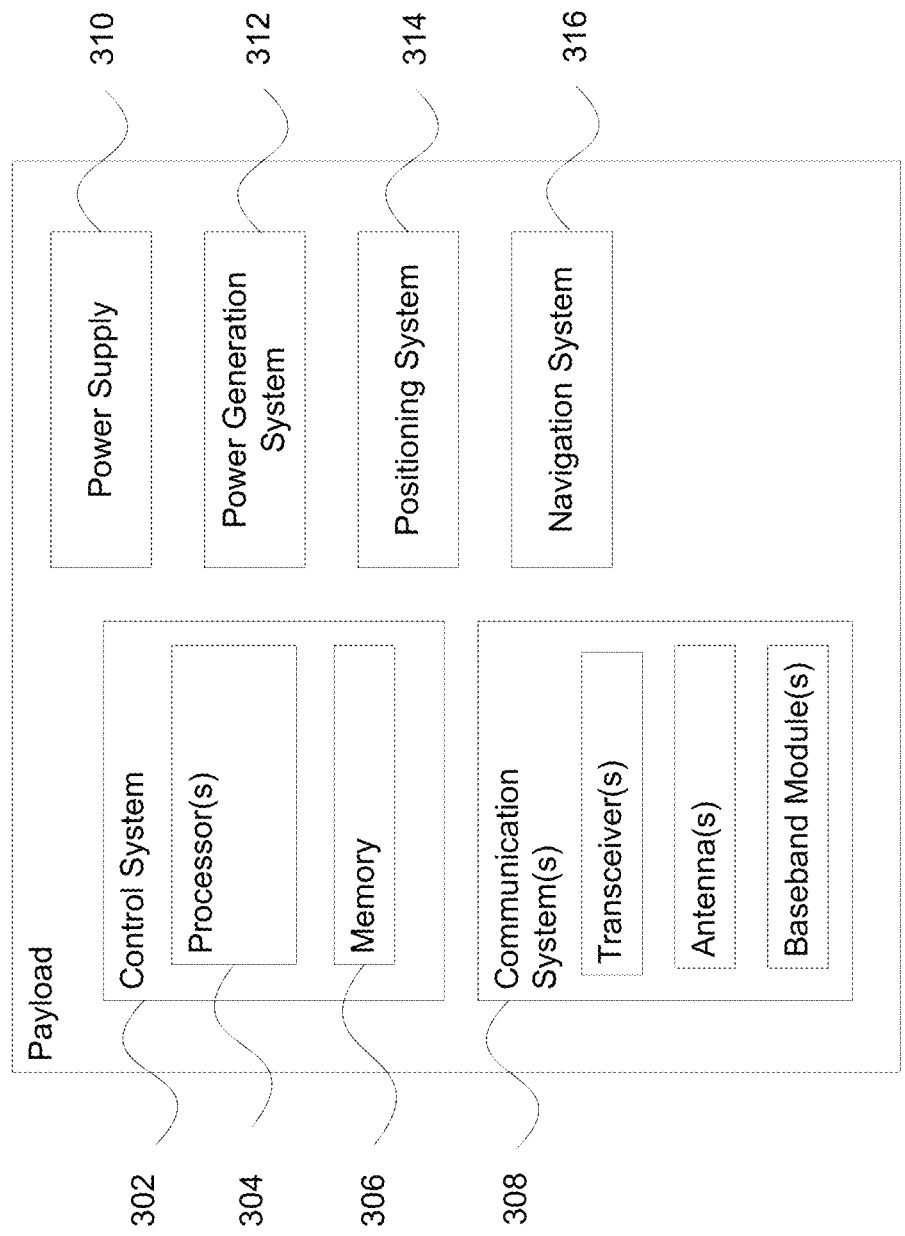
FIG. 3 is an example payload arrangement in accordance with aspects of the technology.

According to one example shown in FIG. 3, a payload 300 of a balloon platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card (e.g., thumb drive or SD card), ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. By way of example only, the communication system 308 may provide LTE or other telecommunications services. The communication system(s) 308 include communication components such as one or more transmitters and receivers (or transceivers), one or more antennas, and one or more baseband modules. As discussed further below, each antenna may have multiple sectors with different beams providing coverage for a number of ground-based users.

The payload 300 is illustrated as also including a power supply 310 to supply power to the various components of the balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system, and/or a star-tracking system. The positioning system 314 may additionally or alternatively include various motion sensors (e.g., accelerometers, magnetometers, gyroscopes, and/or compasses).

Payload 300 may include a navigation system 316 separate from, or partially or fully incorporated into control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the high-altitude balloon. In other embodiments, specific balloons may be configured to compute altitudinal and/or lateral adjustments for other balloons and transmit the adjustment commands to those other balloons.

Figure 4:
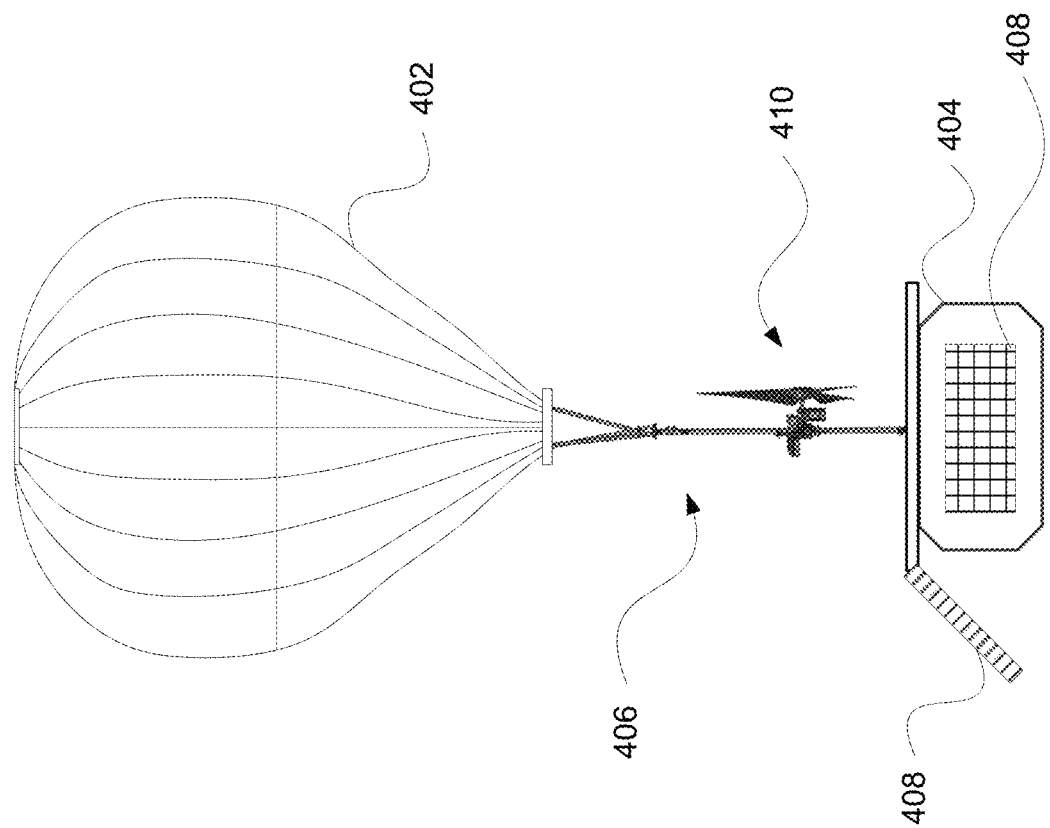
FIG. 4 is an example of a balloon platform with lateral propulsion in accordance with aspects of the technology.

In order to change lateral positions or velocities, the platform may include a lateral propulsion system. FIG. 4 illustrates one example configuration 400 of a balloon platform with propeller-based lateral propulsion, which may represent any of the balloons of FIG. 1. As shown, the example 400 includes an envelope 402, a payload 404 and a down connect member 406 disposed between the envelope 402 and the payload 404. Cables or other wiring between the payload 404 and the envelope 402 may be run within the down connect member 406. One or more solar panel assemblies 408 may be coupled to the payload 404 or another part of the balloon platform. The payload 404 and the solar panel assemblies 408 may be configured to rotate about the down connect member 406 (e.g., up to 360° rotation), for instance to align the solar panel assemblies 408 with the sun to maximize power generation. Example 400 also illustrates a lateral propulsion system 410. While this example of the lateral propulsion system 410 is one possibility, the location could also be fore and/or aft of the payload section 404, or fore and/or aft of the envelope section 402, or any other location that provides the desired thrust vector.

The navigation system is able to evaluate data obtained from onboard navigation sensors, such as an inertial measurement unit (IMU) and/or differential GPS, received data (e.g., weather information), and/or other sensors such as health and performance sensors (e.g., a force torque sensor) to manage operation of the balloon's systems. When decisions are made to activate the lateral propulsion system, for instance to station keep, the navigation system then leverages received sensor data for position, wind direction, altitude and power availability to properly point the propeller and to provide a specific thrust condition for a specific duration or until a specific condition is reached (e.g., a specific velocity or position is reached, while monitoring and reporting overall system health, temperature, vibration, and other performance parameters).

Example Configurations

Figure 5:
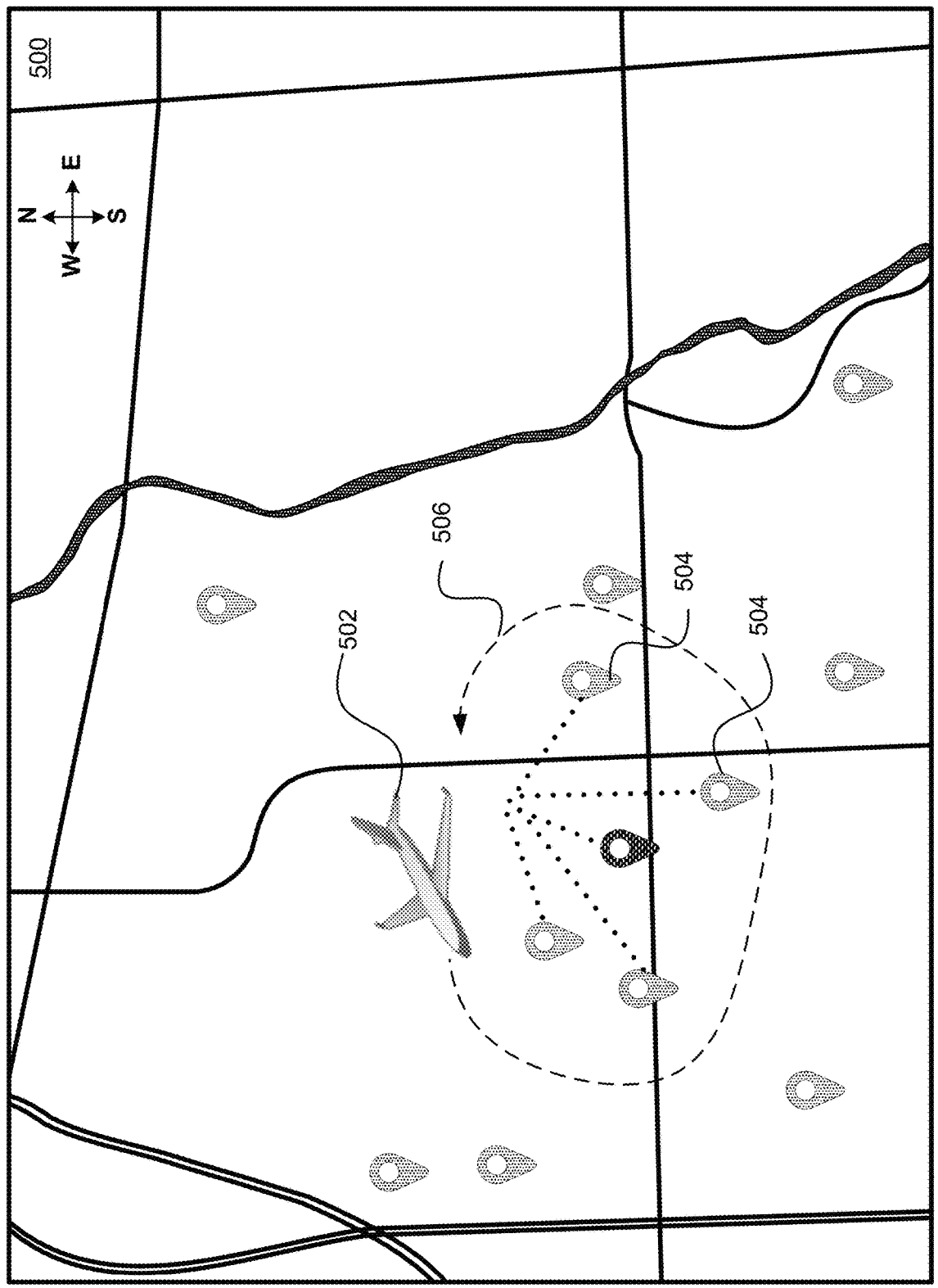
FIG. 5 illustrates a coverage example in accordance with aspects of the technology.

The HAP may perform "station keeping" by moving in a circular or other predetermined pattern in the sky. An example of this is shown in view 500 of FIG. 5. Here, a HAP 502, such as a drone-based HAP, provides telecommunication services (e.g., via LTE communication) to a set of UEs or other client devices 504. The HAP 502 may move relative to a selected geographic region such as a service area, as shown by the dashed line 506. For instance, altitude control and/or a lateral propulsion system may allow the HAP to move into and maintain its predetermined circular pattern over the service area.

Figure 6:
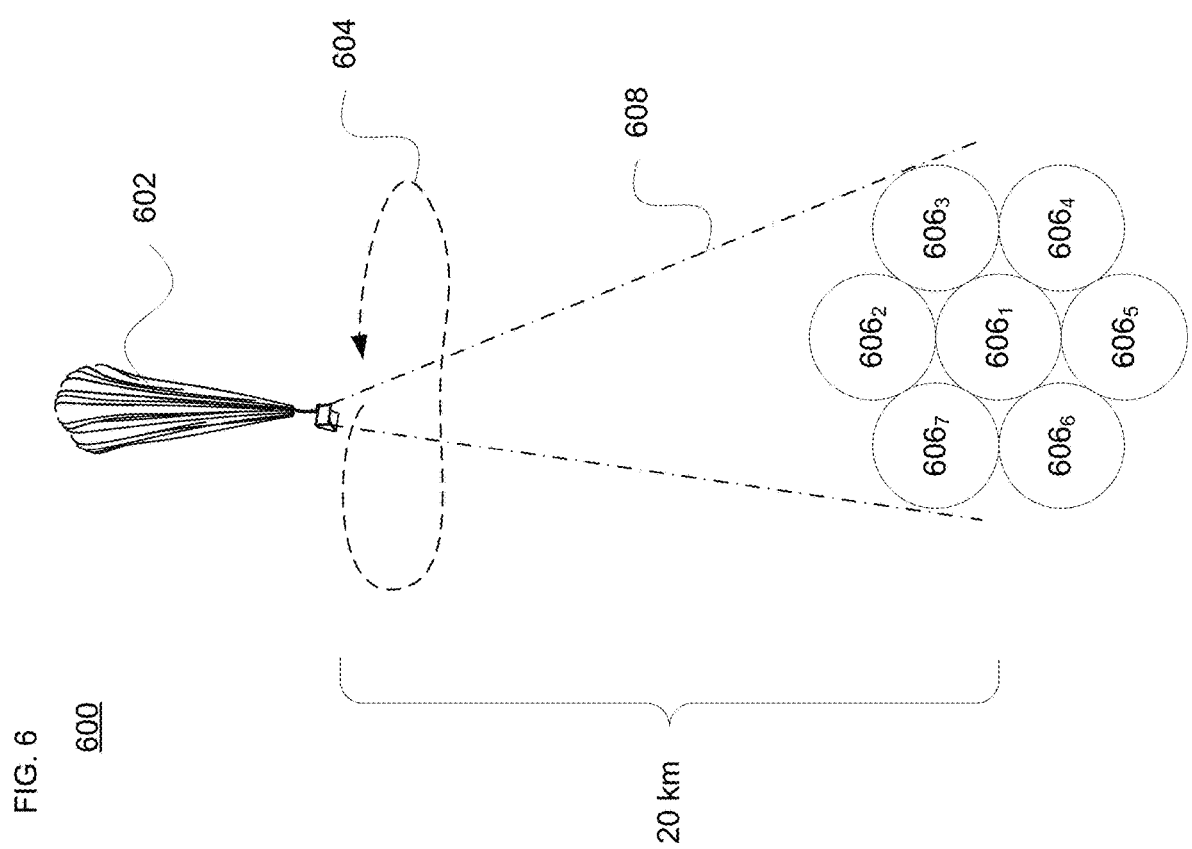
FIG. 6 illustrates an example of station keeping and beam rotation in accordance with aspects of the technology.

FIG. 6 shows an example 600 of a HAP 602 flying at an altitude of 20 km in a predetermined circular pattern (shown by dashed line 604) having a radius smaller than 5 km and generating seven beams $606_1 \ldots 606_7$ on the ground. This provides a footprint having an approximate diameter of 40 km, as indicated by the dash-dot lines 608, with each beam 606 having an approximate diameter on the order of 13 km. As the number of beams increases, the number of supported users per beam decreases. In one scenario, a desired coverage area may include between 7 to 19 beams (or more or less).

Depending on the size of the service area, the HAP's height above the ground, beam size and other factors, the HAP may take several minutes to complete a station keeping loop (e.g., 2-15 minutes, or more or less). This motion can cause the beams 606 emitted by the HAP's communication system and received at the ground to rotate at a rapid rate. For instance, in just a couple of minutes, a pattern of the beams $606_2 \ldots 606_7$ may have rotated once around center beam $606_1$. At the same time, center beam $606_1$ may not rotate or move relative to the ground as the HAP moves, or may move much less than the outer beams $606_2 \ldots 606_7$. As a result, a UE on the ground in an area covered by the outer beams $606_2 \ldots 606_7$ may observe a new beam every 10-15 seconds, or more or less. This rapid motion of beams may cause the UE to perform repeated reselections (e.g., in an idle mode) and handovers (e.g., in a connected mode). This can degrade battery life and reduce the throughput of the system.

While digital beamforming may be used to address beam motion in some systems, this may not be feasible in other systems. For example, additional equipment may be required for digital beamforming especially at higher frequencies (e.g., 1.9 GHZ or higher). Such additional equipment adds weight to the HAP, which can limit service lifetime and coverage capabilities, especially for lighter than air craft operating in the stratosphere.

Figure 7A:
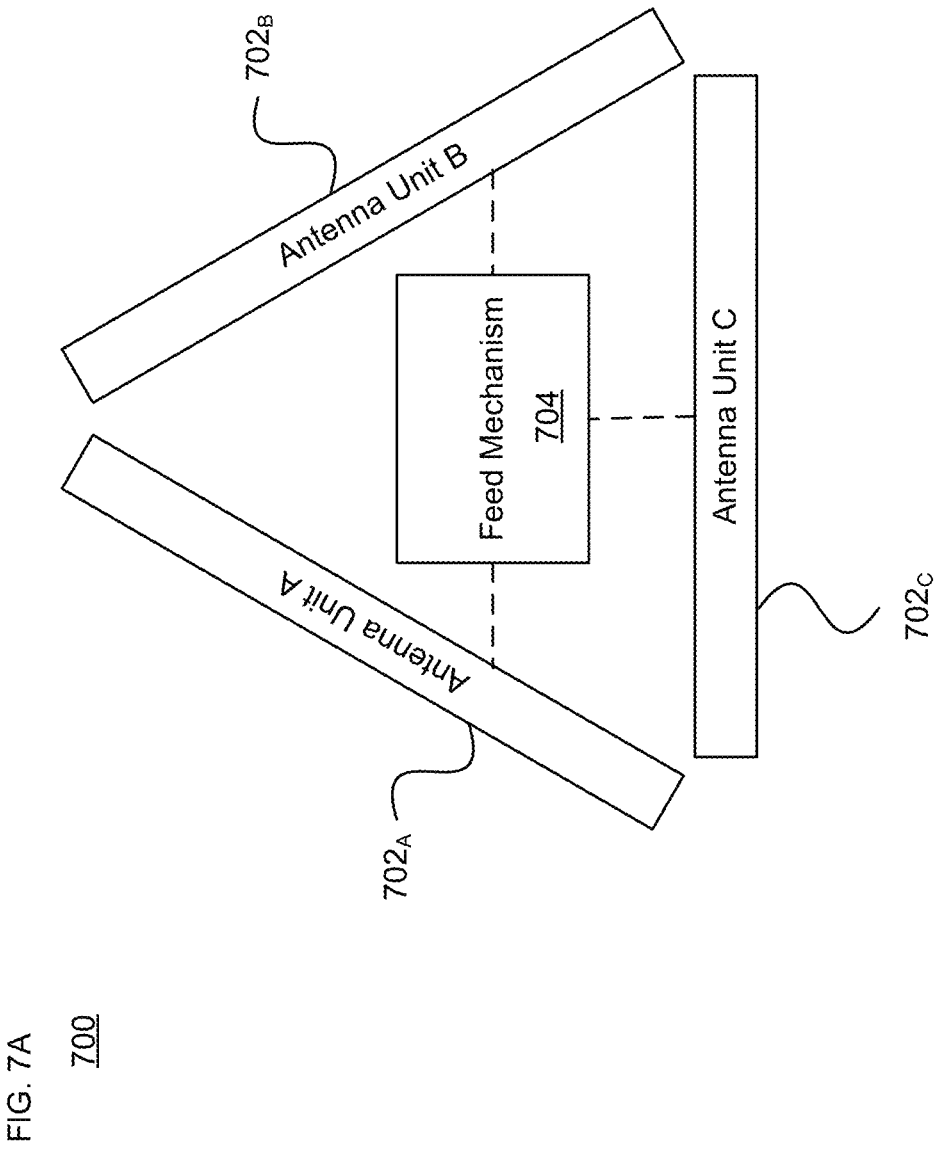
FIGS. 7A-7D illustrate antenna configurations in accordance with aspects of the technology.
Figure 7B:
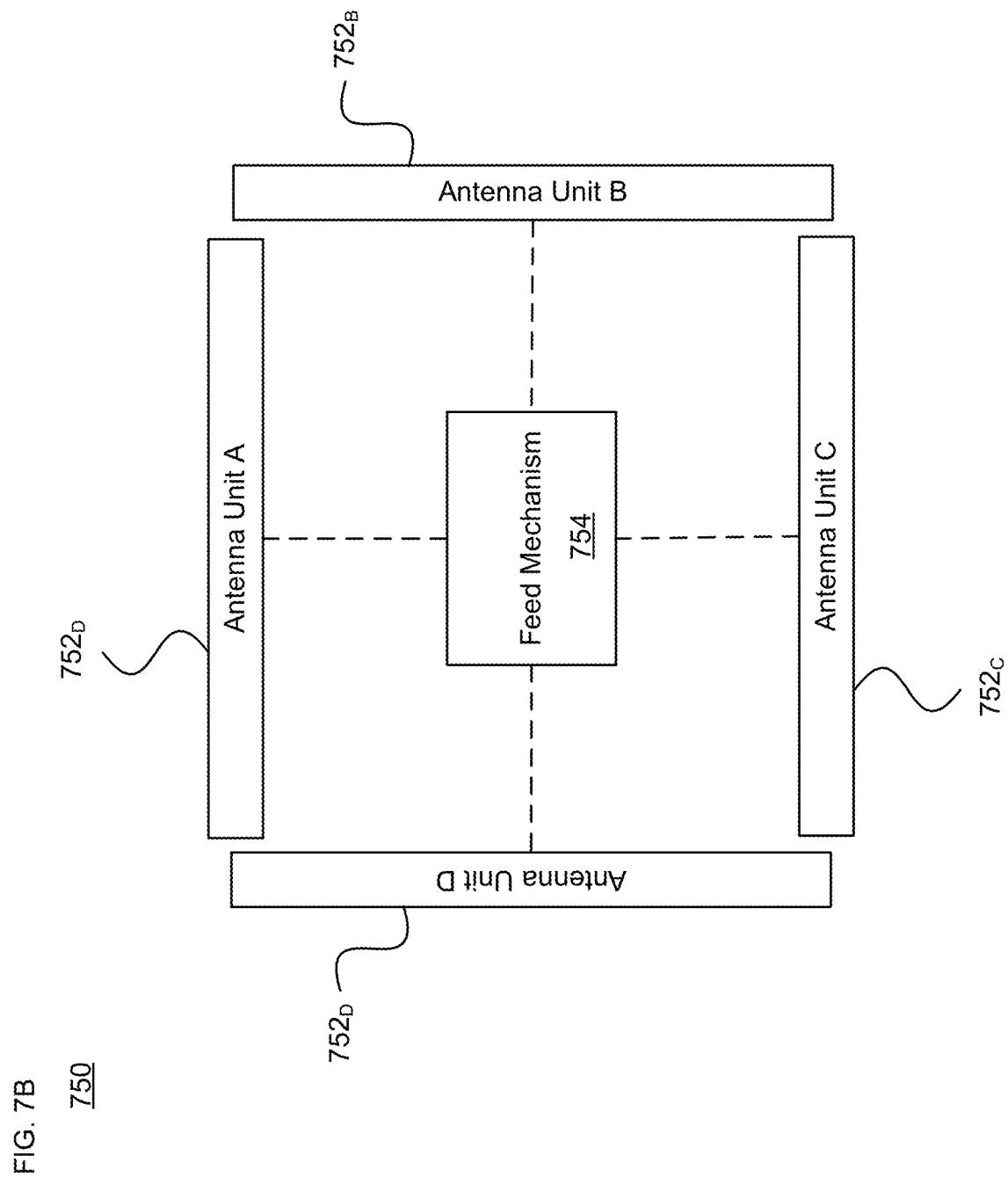

In order to address such issues, HAP motion can be compensated for by using an antenna structure that includes a set of cylindrical or torus-shaped reflector antennas, along with a phase array or other feed mechanism for routing data to the antennas for transmission via the different beams. FIGS. 7A and 7B illustrate two examples, using three and four cylindrical or torus-shaped antenna units, respectively. These reflector antenna arrangements are able to scan (or steer) in one dimension up to, e.g., +/−45°, with limited scanning in an orthogonal direction of up to, e.g., +/−10°.

Steering in azimuth may be implemented as the HAP spins around a center point. Steering in elevation may be implemented as the HAP banks or rolls. Cylindrical and torus-shaped antennas have steering in a first dimension and more limited steering in a second dimension. As described further below, the antenna units may be arranged such that all 360 degrees of the azimuthal plane may be reached by beams transmitted by the antenna units, while some limitations to the reach of the beams in the elevation plane may still exist.

Example 700 of FIG. 7A shows a triangular-shaped three-antenna configuration, where antenna units A (702$_A$), B (702$_B$) and C (702$_C$) Each Cover 120 Degrees of a 360 Degree Scan. For example, each of these antenna units could be a cylindrical shaped antenna, or a torus-shaped antenna. Each of these antenna units 702 has multiple feeds (not shown) such that each antenna's feed is selected based on, for example, azimuth and/or elevation, to compensate for the motion of the HAP. A feed mechanism 704, is operatively coupled to each antenna unit 702. Example 750 of FIG. 7B shows a rectangular-shaped four-antenna configuration, where antenna units A (752$_A$), B (752$_B$), C (752$_C$) and D (752$_D$) each cover 90 degrees of a 360 degree scan. A feed mechanism 754, is operatively coupled to each antenna unit 752. Each of these antenna units 752 has multiple feeds (not shown) such that each antenna's feed is selected based on, for example, azimuth and/or elevation, to compensate for the motion of the HAP.

Each of the multiple cylindrical antenna units 702, 752 may be capable (when excited) of generating a plurality of beams, such as more than 6 beams. One or more of the plurality of beams may form one of the beams 606 shown in FIG. 6. In particular, each cylindrical antenna unit may form one or more of the 6 outer beams shown in FIG. 6, and at least one of the cylindrical antenna units may form the central beam 606$_1$. Alternatively, a separate antenna unit may generate the center beam.

With reference to the beam example of FIG. 6, in the arrangement of FIG. 7A the antenna 702$_A$ may be used to generate outer beam 606$_7$, the antenna 702$_B$ may be used to generate outer beam 606$_3$, and the antenna 702$_C$ may be used to generate outer beam 606$_5$ The other outer beams 606$_2$, 606$_4$ and 606$_6$ may be generated by a single antenna or a combination of antennas. For example, the antennas 702$_A$ and 702$_B$ may, in combination, generate outer beam 606$_2$, the antennas 702$_B$ and 702$_C$ may, in combination, generate outer beam 606$_4$, and the antennas 702$_A$ and 702$_C$ may, in combination, generate outer beam 606$_6$.

Further, with reference to the beam example of FIG. 6, in the arrangement of FIG. 7B, the antenna 702$_A$ may be used to generate outer beam 606$_2$, the antenna 702$_B$ may be used to generate outer beams 606$_3$ and 606$_4$, the antenna 702$_C$ may be used to generate outer beam 606$_5$, and the antenna 702$_D$ may be used to generate outer beams 606$_6$ and 606$_7$. As the beams roll over, e.g., from antenna 702$_A$ to antenna 702$_B$ to antenna 702$_C$, etc., the signals are routed differently to compensate for this.

A cylindrical-shaped antenna has a property that we can steer through a wider angle over a first dimension, and can steer through a narrower angle a second dimension. For example, in the architecture described above, each antenna unit can steer +/−45° along the azimuth plane and steer +/−10° along the elevation plane. This steering angle along the elevation plane may be larger when using torus shaped antennas instead of cylindrical-shaped antennas.

Figure 7C:
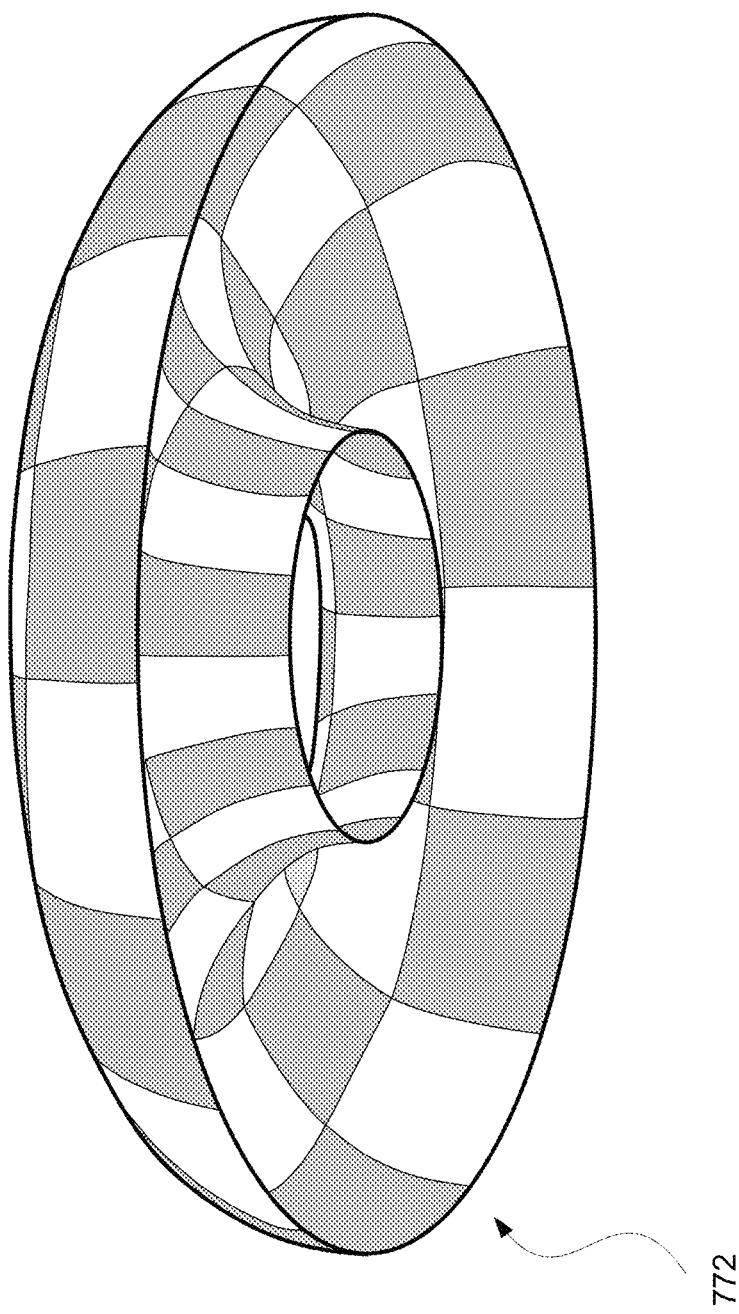

In an alternative architecture, one or more donut-torus antennas may be employed. The donut-torus antenna may replace the 4 antennas 752$_A$-752$_D$ in FIG. 7B and cover the entire elevation space smoothly. As shown in example configuration 770 in FIG. 7C, a torus-shaped antenna 772 has a donut or annular-type arrangement, with parabolically curved sides. The checkered pattern shading in FIG. 7C is included to show the curvature of the antenna 772.

For each antenna configuration, the beam diameters are determined by the dimensions of the antennas.

The cylindrical or torus-shaped antenna units are parabolic reflector-type antennas. In one scenario, the antennas use phased array fed reflectors (PAFRs), which provide a compromise between reflectors and direct radiating phased arrays (DRAs). PAFRs provide many of the performance benefits of DRAs while utilizing much smaller, lower cost (feed) arrays.

Figure 7D:
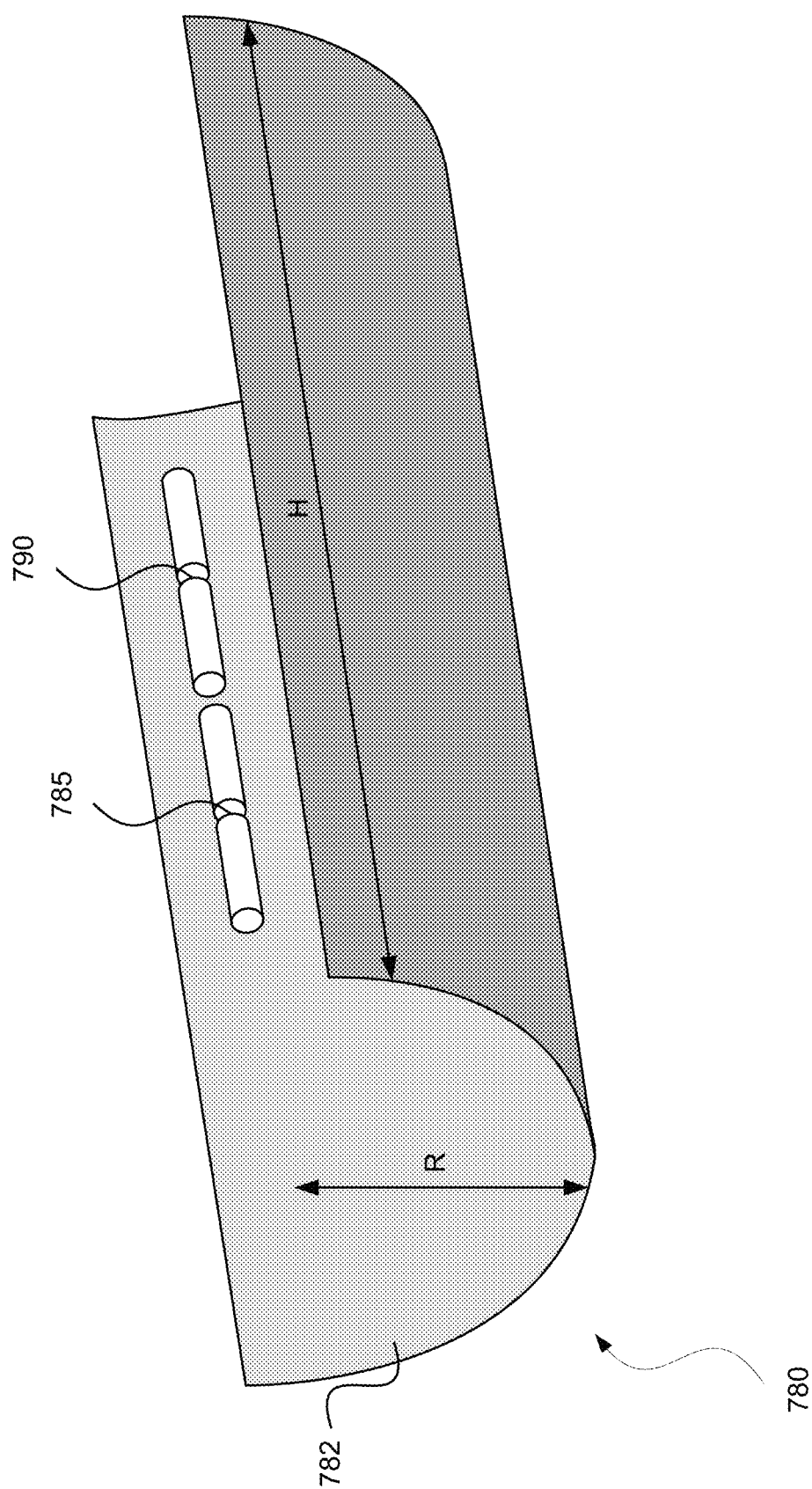

Using the triangular arrangement 700 of FIG. 7A as an example, the phased array (or feed structure) scans beams in azimuth using the cylindrical antenna units A, B and C. As the HAP rotates, the beams on the ground are fixed by using different beams from the antenna units A, B and C. As shown in FIG. 7D, each of the cylindrical antenna units A, B and C may include a two-element fed reflector 780 including feeds 785 and 790 placed along an axis of a semi-cylindrical reflector 782 having a radius R and a length H. The phase of the feeds 785 and 790 may be varied so as to scan in azimuth. In some implementations, more than two feeds may be included in the antenna unit and be varied in phase to perform digital beamforming. In some examples, horn antenna pointing may be implemented to direct a beam in a particular direction or a plurality of beams in a plurality of directions. Through feed selection, a respective one of a plurality of horn antenna may be controlled to generate beams via multiple feeds at different times to move the outer beams 606$_2$-606$_7$ around the center beam 606$_1$ as shown in FIG. 6.

Switching beams between cylindrical/torus antennas may be handled digitally, such as by a field-programmable gate array (FPGA) of the feed mechanism. The phased array can be a single array or four separate phase arrays, one for each cylindrical/torus antenna. Alternatively, a non-phased array architecture may be used.

In some examples, a multiple input, multiple output (MIMO) arrangement may be used. By way of example, a 2×2 MIMO system can be used, in which each beam 606$_2$-606$_7$ shown in FIG. 6 has two input signals, which are sent with different polarizations. The polarizations may be orthogonal, such as vertical and horizontal polarization. Alternatively, a single patch antenna can be fed in two places to generate 2 polarizations.

Figure 8:
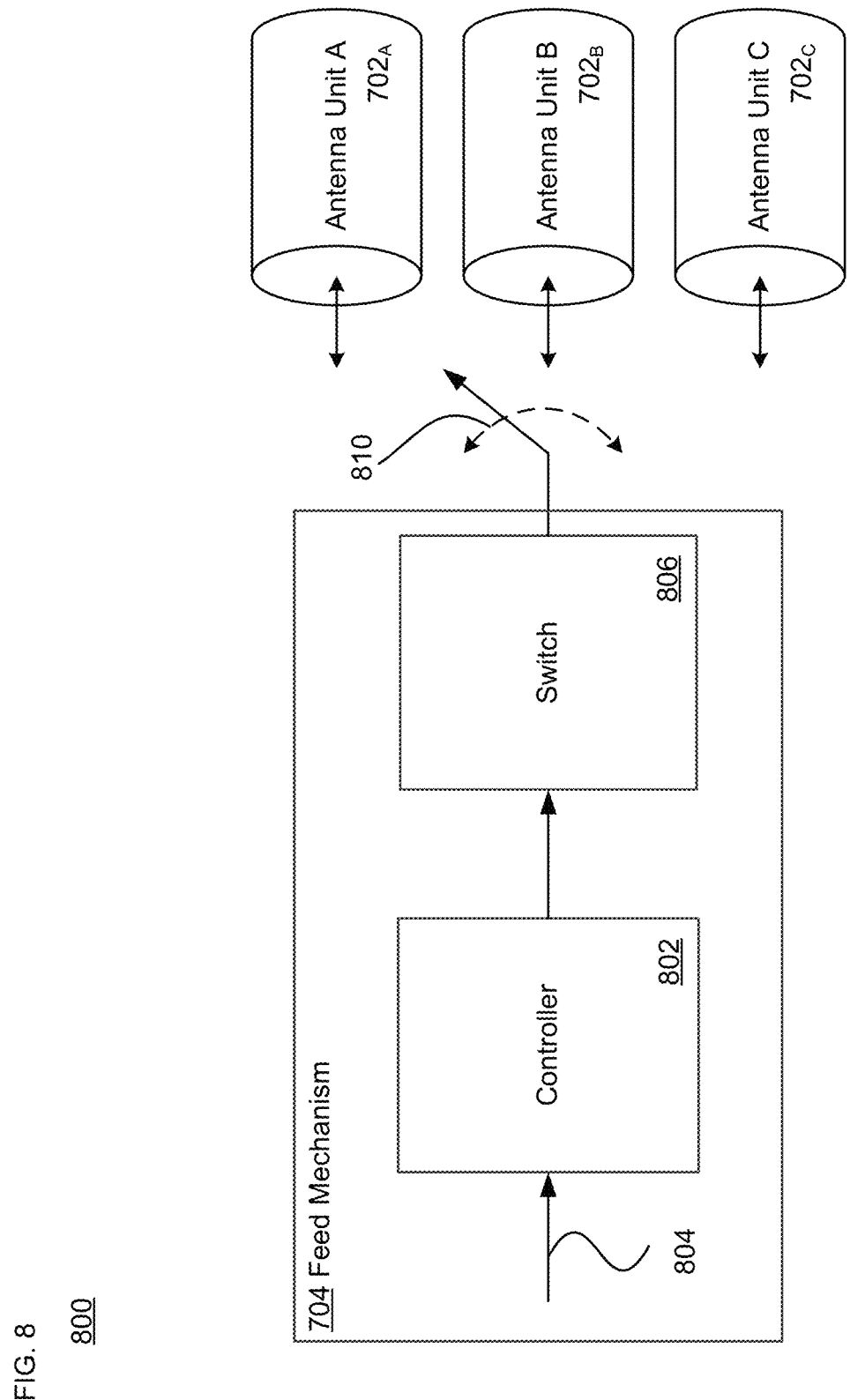
FIG. 8 illustrates an antenna system in accordance with aspects of the technology.

As the HAP moves relative to the ground, the feed mechanism may employ antenna selection to pick a beam among the beams 606$_1$-606$_7$ with the appropriate elevation or azimuthal steering given a location of a UE on the ground and a location and orientation (i.e., pose) of the HAP. As mentioned above, each of antenna may have multiple feeds (not shown). The antenna selection may therefore include selecting one or more particular feeds of an antenna for transmitting the beam. The one or more particular feeds may be selected based on, for example, which feeds are capable of pointing in an azimuth and/or elevation corresponding to the location of the UE on the ground given the location and orientation of the HAP. This selection ensures that the correct signals are used to generate beams that compensate for movement of the HAP. FIG. 8 illustrates an example antenna system 800 that may be employed, for instance with regard to antenna arrangement 700 of FIG. 7A or arrangement 750 of FIG. 7B to generate multiple beams. As shown, the feed mechanism 704 or 754 may include a controller 802, which may be a field-programmable gate array (FPGA) microcontroller and/or other processing device, and an antenna array switching circuit 806. The controller 802 may route signals 804 via the antenna array switching circuit 806 to a plurality of cylindrical antenna units $702_A$, $702_B$ and $702_C$.

Dotted arrow 810 indicates that the switch passes the signals 804 to the respective antenna unit 702 in accordance with a desired beam arrangement and direction.

The antenna array switching circuit 806 may be controlled by the controller 802 to select one or more of the cylindrical antenna units 702 associated with the beam having the appropriate elevation or azimuthal steering to reach a UE on the ground. The beam may be chosen based on the location of the beam on the ground and the location of the HAP.

For example, at a first point in time, the controller 802 may direct the signal 804 via the antenna array switching circuit 806 to be transmitted via antenna unit $702_A$ because the UE is located in the area covered by beam $606_2$, which is generated by antenna unit $702_A$. At a second point in time, based on the movement of HAP 602, the antenna system may have rotated such that the same area where the UE is located may no longer be covered by beam $606_2$, but rather may be covered by beam $606_7$, which is generated by antenna unit $702_C$. Because of the detected movement of HAP 602 relative to the area, the controller 802 may therefore direct the signal 804 to antenna unit $702_C$ at the second point in time via the antenna array switching circuit 806.

Figure 9:
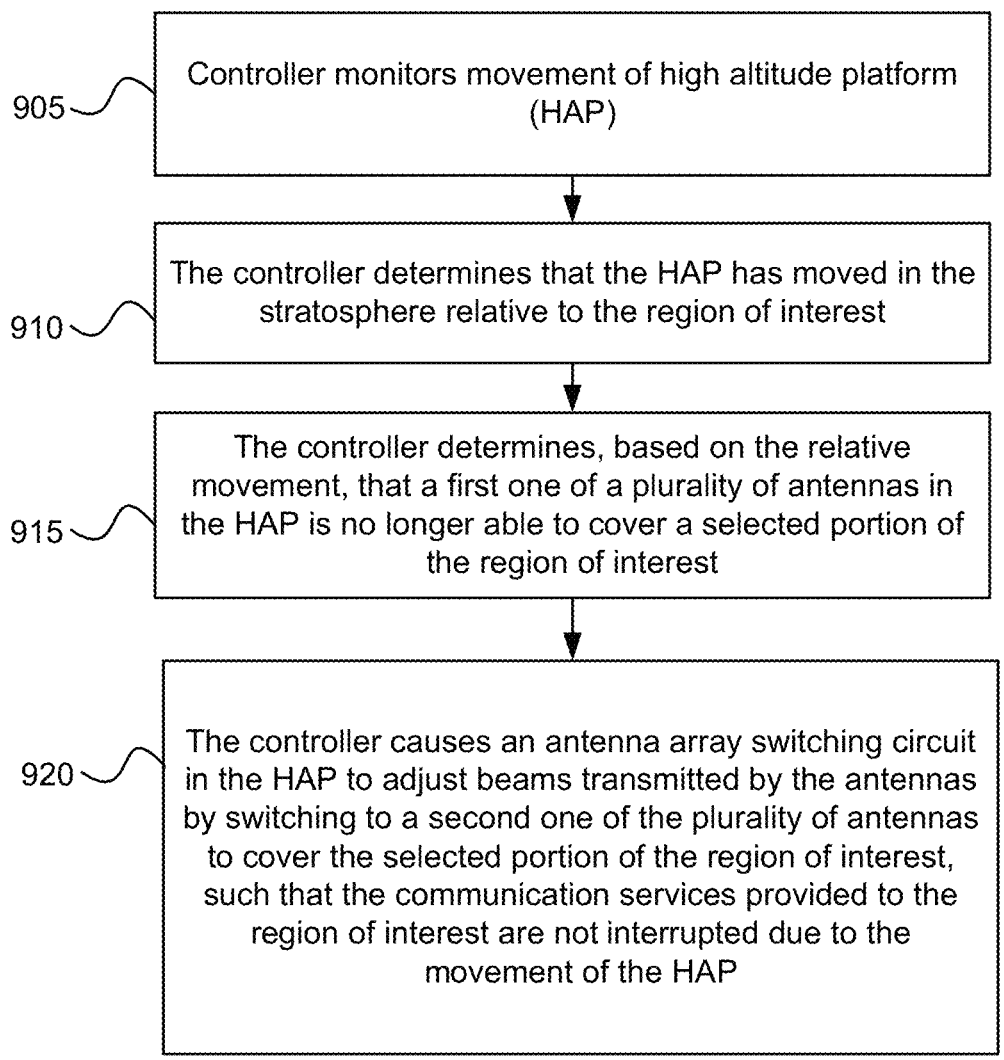
FIG. 9 is a flow chart of a method in accordance with aspects of the technology.

FIG. 9 is a flow chart of a method 900 of a HAP configured to move in a pattern in the stratosphere to provide coverage to a region of interest and compensate for the movement of the HAP relative to the region of interest, in accordance with aspects of the technology. In step 905, a controller monitors movement of the HAP. In step 910, the controller determines that the HAP has moved in the stratosphere relative to the region of interest. In step 915, the controller determines, based on the relative movement, that a first one of a plurality of antennas in the HAP is no longer able to cover a selected portion of the region of interest. In step 920, the controller causes an antenna array switching circuit in the HAP to adjust beams transmitted by the antennas by switching to a second one of the plurality of antennas to cover the selected portion of the region of interest, such that the communication services provided to the region of interest are not interrupted due to the movement of the HAP.

In some implementations, method 900 may be performed based on a known future path of the HAP using a GPS location. For example, the controller may predict movement of the HAP using the known future path and a current GPS location and predict the relative movement of the HAP to the region of interest using the predicted movement. It may then be determined that, at a future point in time or a future location, a first one of a plurality of antennas in the HAP is no longer able to cover a selected portion of the region of interest. The switching from the first one of the plurality of antennas to a second one of the plurality of antennas may then be scheduled and executed at the future point in time or the future location.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the aspects should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible aspects. Further, the same reference numbers in different drawings can identify the same or similar elements.

The invention claimed is:

1. An antenna system included in a high-altitude platform (HAP), the HAP configured to move in a pattern in the stratosphere to provide communication services to a region of interest by forming a plurality of beams to cover the region of interest, wherein a plurality of coverages formed by the plurality of beams to cover the region of interest can rotate relative to the region of interest in accordance with the movement of the HAP in the stratosphere, the antenna system configured to compensate for the movement of the HAP in the stratosphere relative to the region of interest, the antenna system comprising:
 a feed mechanism including:
  a controller; and
  an antenna array switching circuit configured to receive communication signals from the controller associated with a plurality of beams; and
 a plurality of antenna units operatively coupled to the feed mechanism, each of the plurality of antenna units being configured to transmit beams that provide communication services to a selected portion of the region of interest, wherein the plurality of antenna units are cylindrical or torus-shaped antenna units that are phased array fed reflectors (PAFRs),
 wherein the controller is configured to:
  determine that the HAP has moved in the stratosphere relative to the region of interest,
  determine, based on the relative movement of the HAP, that a first one of the plurality of antenna units will no longer be able to provide a first coverage for providing the communication services to the selected portion of the region of interest,
  select one of multiple feeds of a second one of the plurality of antenna units based on at least one of azimuth or elevation, wherein the second one of the plurality of antenna units contains at least one of the plurality of antenna units that was utilized to form beams to provide a second coverage adjacent to the first coverage, and
  cause the antenna array switching circuit to adjust the beams transmitted by the antenna units by switching from the first one of the plurality of antenna units to the second one of the plurality of antenna units to provide the communication services via the selected feed to the selected portion of the region of interest while compensating for the relative movement of the HAP, such that an interruption of the communication services provided to the selected portion of the region of interest due to the movement of the HAP is prevented, wherein the interruption of the communication services includes repeated reselections in an idle mode and handovers in a connected mode.

2. The antenna system of claim 1, wherein the cylindrical or torus-shaped antenna units are parabolic reflector-type antennas.

3. The antenna system of claim 1, wherein a center beam and any exterior beams surrounding the center beam are configured to provide the communication services to a region of interest having a diameter of at least 40 km.

4. The antenna system of claim 1, wherein the plurality of beams includes at least a set of exterior beams disposed around a center beam.

5. The antenna system of claim 4, wherein the set of exterior beams comprise at least 6 beams.

6. The antenna system of claim 1, wherein the antenna array switching circuit comprises a field-programmable gate array (FPGA) configured to route feed signals to the plurality of antenna units.

7. A high altitude platform (HAP) configured to operate in the stratosphere, the HAP comprising:
the antenna system of claim 1; and
a propulsion system operatively coupled to the antenna system, the propulsion system being configured to adjust a position of the HAP in the stratosphere relative to the region of interest.

8. A method of controlling a high-altitude platform (HAP) to move in a pattern in the stratosphere to provide coverage to a region of interest and compensate for the movement of the HAP relative to the region of interest by forming a plurality of beams to cover the region of interest, wherein a plurality of coverages formed by the plurality of beams on the region of interest can rotate relative to the region of interest in accordance with the movement of the HAP in the stratosphere, the method comprising:
monitoring, by a controller, movement of the HAP in the stratosphere;
determining, by the controller, that the HAP has moved in the stratosphere relative to the region of interest;
determining, by the controller based on the relative movement of the HAP, that a first one of a plurality of antenna units in the HAP will no longer be able to provide a first coverage for providing communication services to a selected portion of the region of interest, wherein the plurality of antenna units are cylindrical or torus-shaped antenna units that are phased array fed reflectors (PAFRs);
selecting, by the controller, one of multiple feeds of a second one of the plurality of antenna units based on at least one of azimuth or elevation, wherein the second one of the plurality of antenna units contains at least one of the plurality of antenna units that was utilized to form beams to provide a second coverage adjacent to the first coverage; and
causing, by the controller, an antenna array switching circuit in the HAP to adjust beams transmitted by the plurality of antenna units by switching from the first one of the plurality of antenna units to the second one of the plurality of antenna units to provide the communication services via the selected feed to the selected portion of the region of interest while compensating for the relative movement of the HAP, such that an interruption of the communication services provided to the selected portion of the region of interest due to the movement of the HAP is prevented, wherein the interruption of the communication services includes repeated reselections in an idle mode and handovers in a connected mode.

9. The method of claim 8, wherein the beams transmitted by the plurality of antenna units include at least a set of exterior beams disposed around a center beam.

10. The method of claim 9, wherein the set of exterior beams comprise at least 6 beams.

11. The method of claim 8, wherein the cylindrical or torus-shaped antenna units are parabolic reflector-type antennas.

12. The method of claim 8, further comprising varying a phase of the multiple feeds of one or more of the plurality of antenna units to scan in at least one of azimuth or elevation.

13. An antenna system included in a high-altitude platform (HAP), the HAP configured to move in a pattern in the stratosphere to provide communication services to a region of interest by forming a plurality of beams to cover the region of interest, wherein a plurality of coverages formed by the plurality of beams on the region of interest can rotate relative to the region of interest in accordance with the movement of the HAP in the stratosphere, the antenna system configured to prevent an interruption in the communication services due to the movement of the HAP, the antenna system comprising:
a plurality of antenna units, each of the plurality of antenna units being configured to transmit beams that provide communication services to a selected portion of the region of interest, wherein the plurality of antenna units are cylindrical or torus-shaped antenna units that are phased array fed reflectors (PAFRs); and
a controller configured to:
determine, based on relative movement of the HAP, that a first one of the plurality of antenna units will no longer be able to provide a first coverage for providing the communication services to the selected portion of the region of interest,
select one of multiple feeds of a second one of the plurality of antenna units based on at least one of azimuth or elevation to compensate for the relative movement of the HAP, wherein the second one of the plurality of antenna units contains at least one of the plurality of antenna units that was utilized to form beams to provide a second coverage adjacent to the first coverage, and
based on the determination, adjust the beams transmitted by the antenna units so that the second one of the plurality of antenna units provides the communication services via the selected feed to the selected portion of the region of interest while compensating for the relative movement of the HAP, wherein the interruption of the communication services includes repeated reselections in an idle mode and handovers in a connected mode.

14. The antenna system of claim 13, further comprising an antenna array switching circuit, wherein the controller is further configured to cause the antenna array switching circuit to adjust the beams transmitted by the antenna units by switching from the first one of the plurality of antenna units to the second one of the plurality of antenna units.

15. The antenna system of claim 13, wherein the cylindrical or torus-shaped of antenna units are parabolic reflector-type antennas.

* * * * *